Dec. 18, 1962 C. O. BROWN 3,069,049
MACHINE FOR FEEDING AND ORIENTING HEADLESS SCREWS
Filed June 9, 1955 9 Sheets-Sheet 4
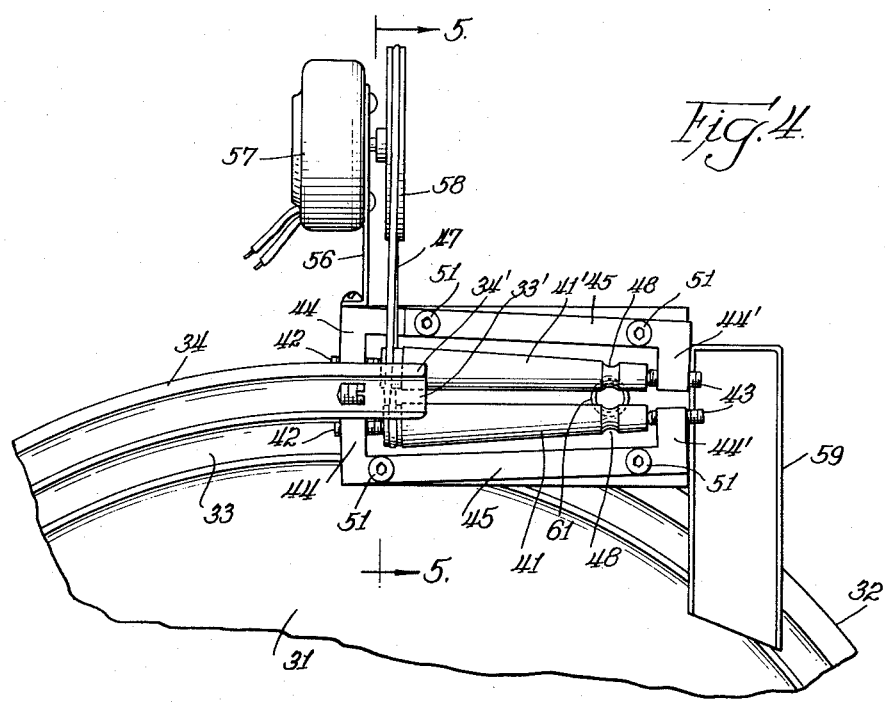
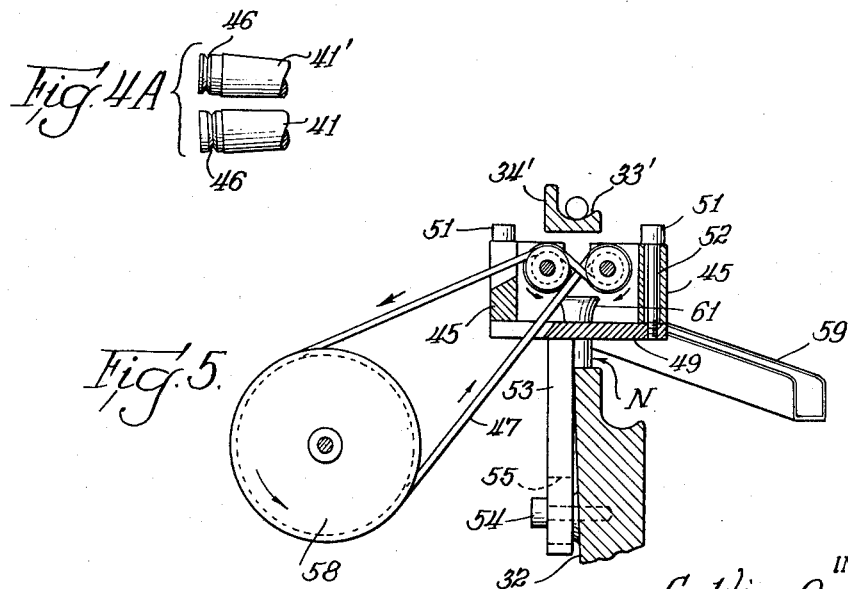
INVENTOR.
Calvin O. Brown Dec. 18, 1962     C. O. BROWN     3,069,049
MACHINE FOR FEEDING AND ORIENTING HEADLESS SCREWS
Filed June 9, 1955     9 Sheets-Sheet 5
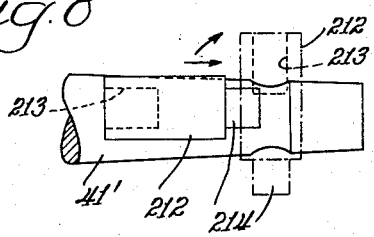
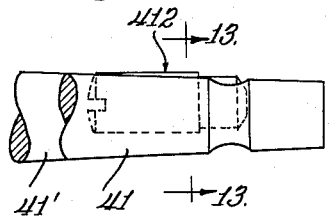
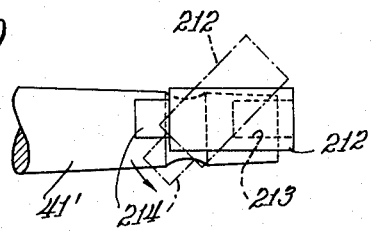
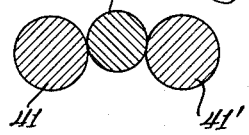
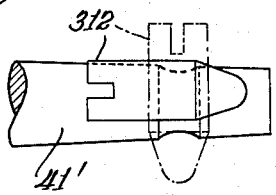
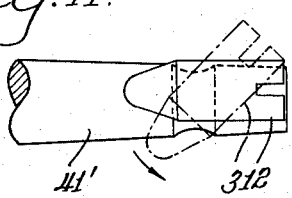
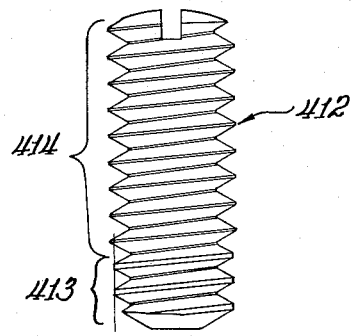
INVENTOR.
Calvin O. Brown

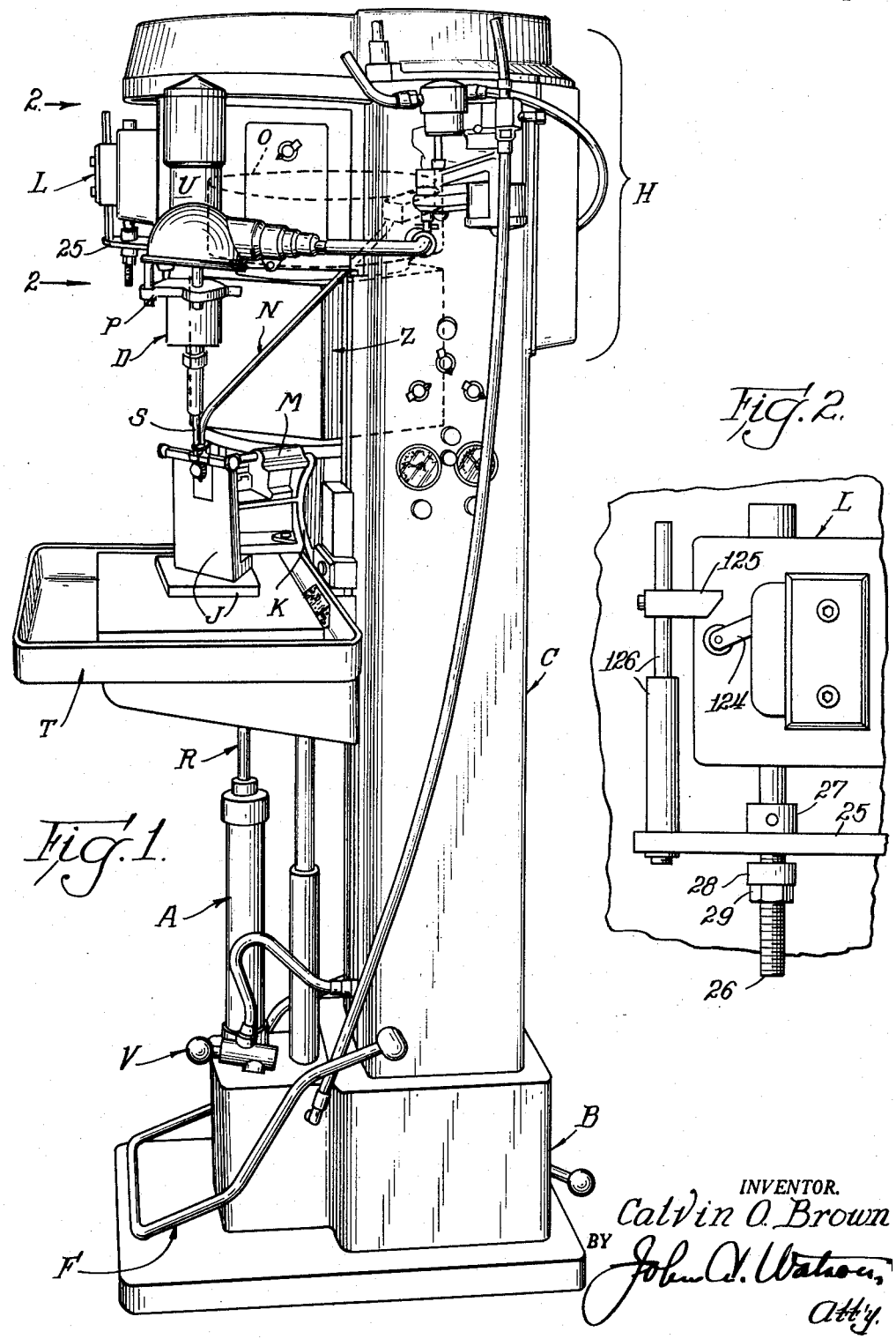

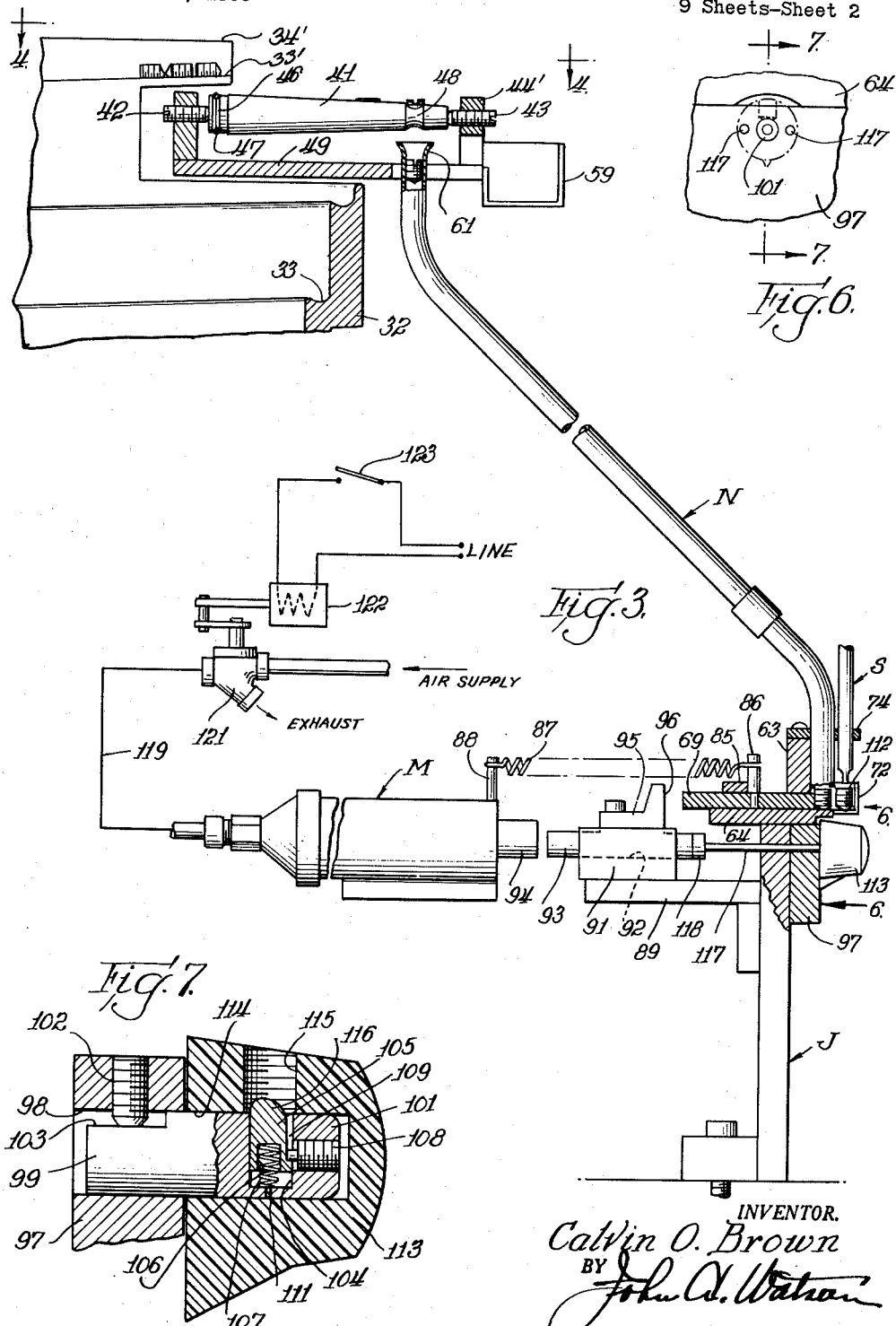

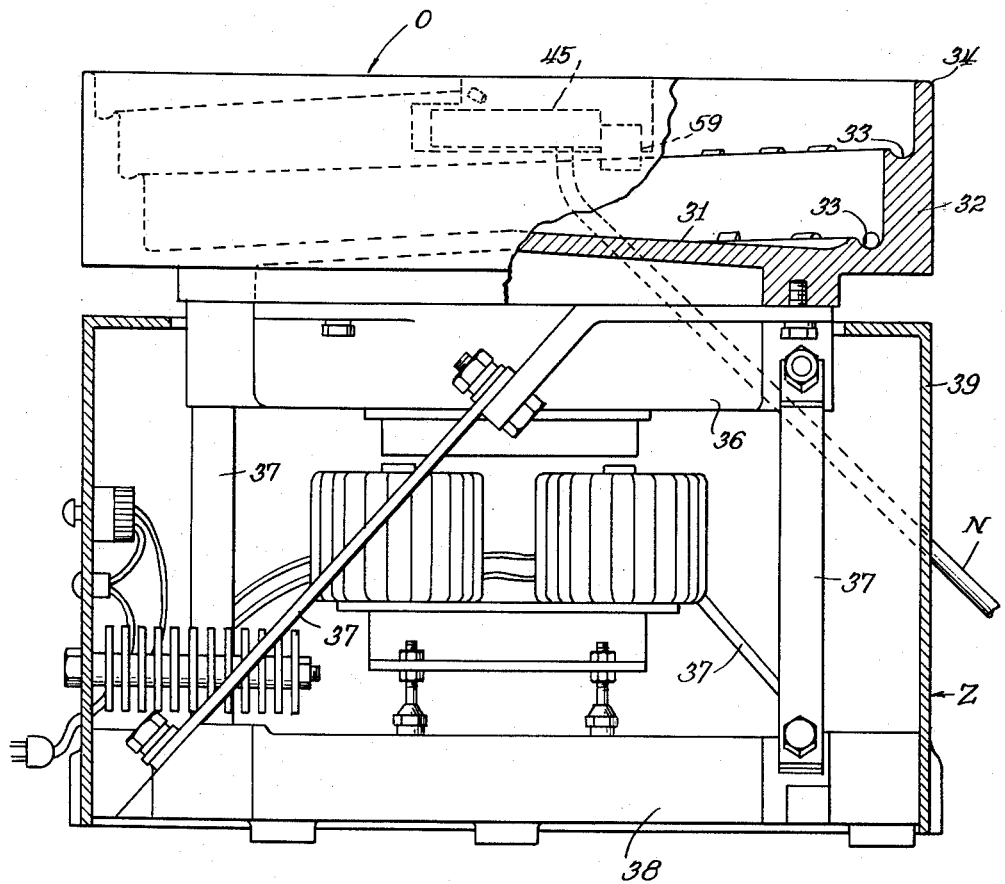

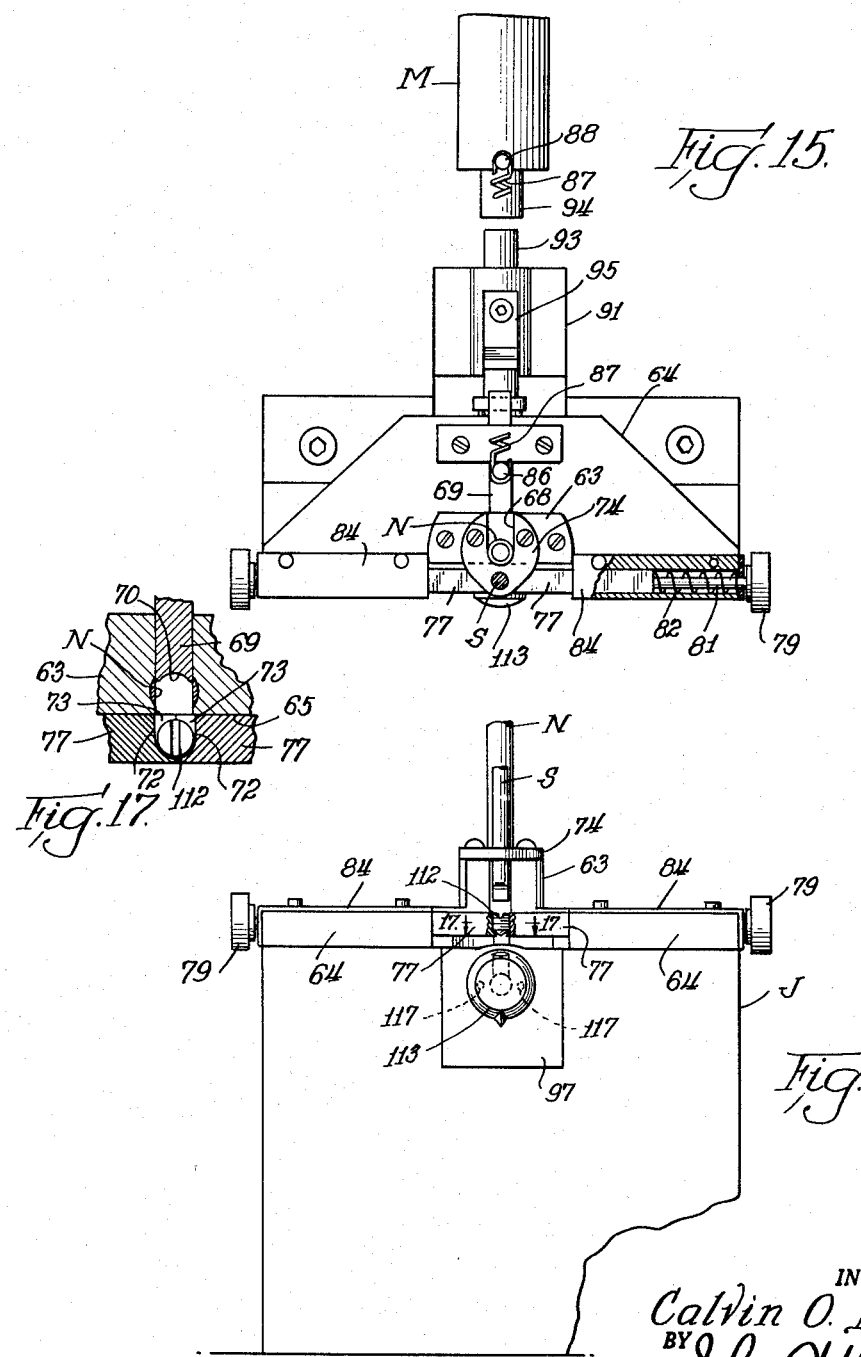

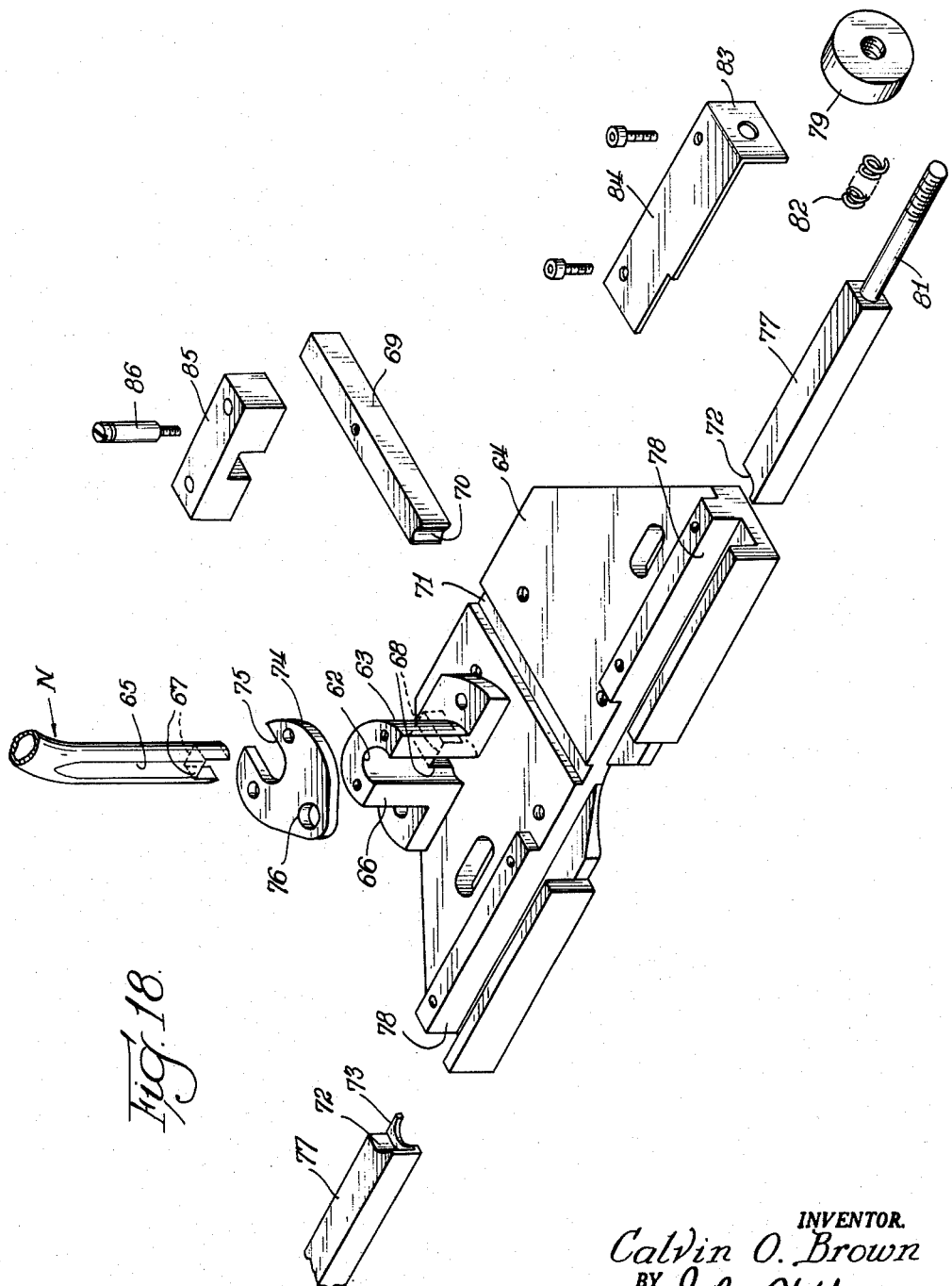

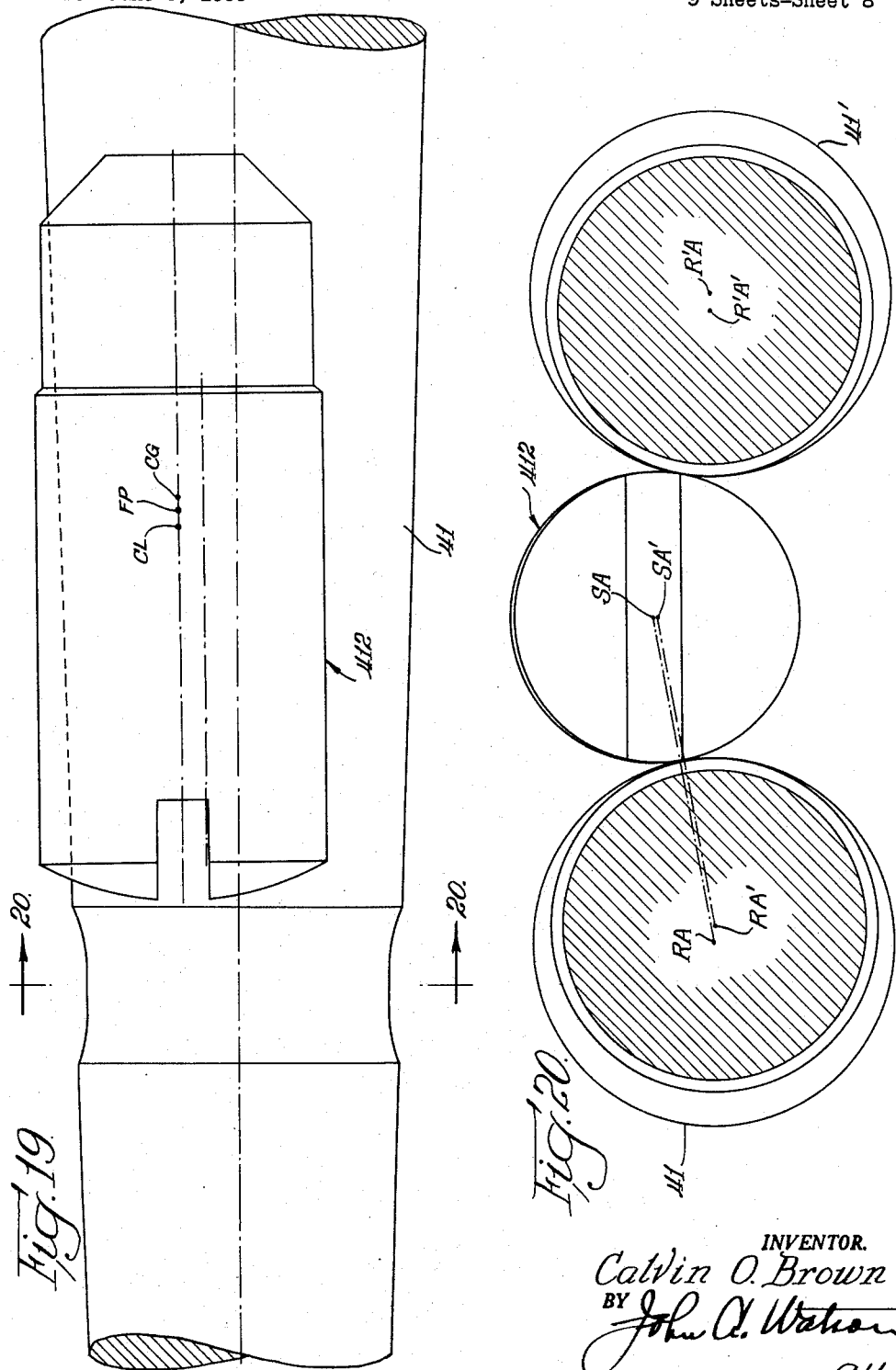

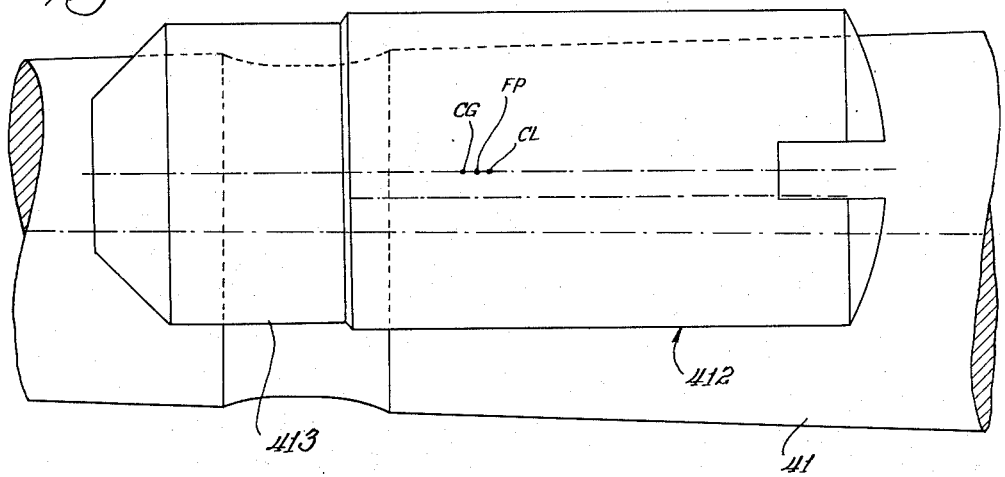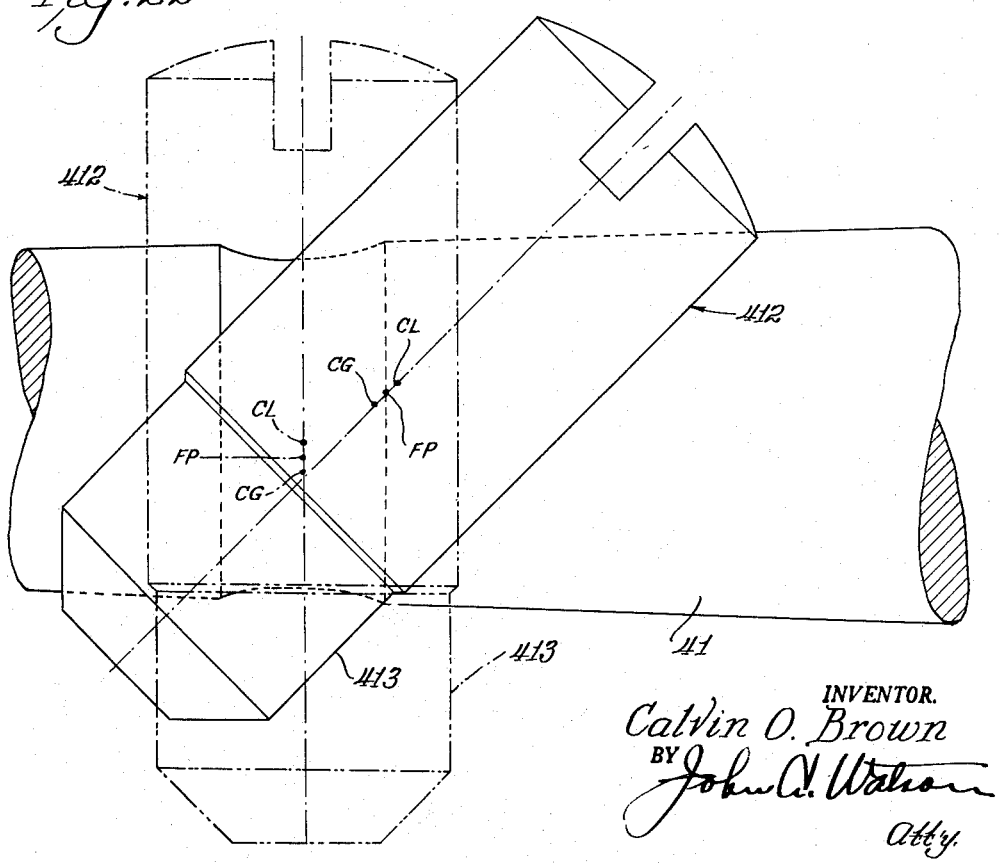

United States Patent Office 3,069,049
Patented Dec. 18, 1962

3,069,049
MACHINE FOR FEEDING AND ORIENTING HEADLESS SCREWS
Calvin O. Brown, Bartlett, Ill., assignor to Set Screw & Mfg. Company, Bartlett, Ill., a corporation of Illinois
Filed June 9, 1955, Ser. No. 514,299
8 Claims. (Cl. 221—171)

This invention pertains to machines and methods for the automatic and continuous feed, orientation, positioning and driving, inserting or setting of small items such as headless screws, pins, studs and the like which, especially in the small sizes, are awkward or difficult to hold or manipulate by hand. In a more particular sense the invention involves machines and mechanisms by which tedious and time consuming hand processes of picking up, orienting, positioning and driving, setting or inserting headless but longitudinally or gravimetrically asymmetric pins and screws, may be performed quickly, accurately and, in all, most effectively in a fraction of the time and with but a minor part of the expense involved when the same operations are performed by hand. Although the invention primarily is concerned with the handling of very small headless screws, studs and the like in sizes below, say, one-half (½) inch in diameter, it is not limited thereto but may be employed to handle screws, studs, pins and the like of substantially larger diameter sizes than one-half (½) inch and, of course, of various lengths.

One of the principal objects of the invention is to provide an orienting mechanism of such nature that headless but longitudinally or gravimetrically asymmetric articles including pins, set screws, adjusting screws, rollers and the like may be automatically and rapidly positioned in the same predetermined order and delivered in that order to a driving, setting or other mechanism for immediate assembly with or application to articles of work or for delivery to some transportable magazine or receiver for use at some other time or place.

Another principal object is to provide an orienting mechanism capable of orienting headless but longitudinally or gravimetrically asymmetric articles such, for instance, as set screws and the like, whether such screws have slotted, socketed, slabbed or other tool engaging or driving end form and regardless of the type or formation of the opposite or lead end so long as the center of gravity is located at a point unequally spaced from the opposite ends of the screw or other article or unequally spaced from the opposite ends of a particular part of the length of an article such as the threaded length of a set screw even though the threaded length is only a part of the total length of the screw.

Another primary object is to provide a mechanism mechanism which will not only orient a continuous stream or succession of like or similar articles of the character mentioned but which will also automatically reject both oversize and undersize articles thereby to serve a classifying function as well as an orienting function.

Still another important object is to provide mechanism by which positively to position or insert articles, such as those mentioned, within bores in work items or articles in which they are to be received and which mechanism will also so dispose the work items that their bores into which screws or pins are to be received are oriented in proper axial alignment with the axes of the pre-oriented screws or pins and with the means by which screws or pins are to be driven or inserted within such bores, thereby facilitating assembly and eliminating or minimizing chance of cross-threading, jamming and other undesirable results.

Many other objects as well as the advantages and uses of the invention will be or should become apparent and understood after reading the following description and claims and after viewing the drawings in which:

FIG. 1 is a view in perspective of a pneumatic controlled power operated drill press of a type, character and mode of operation such as one of those disclosed in Goldberg Patents Nos. 2,472,967 and 2,472,968 of June 14, 1949, as such machine has been modified and adapted for use in power driving or setting headless set screws and further modified by the combination of a presently preferred form of the invention therewith;

FIG. 2 is a view of an electric control mechanism by which the stroke or vertical up and down movements of the drill head may be employed to control certain functions of the machine.

FIG. 3 is a view on a large scale showing, partly in section and partly in elevation, a portion of a bowl type hopper for supply of screws to be oriented and driven, portions of the orienting rollers, the screw feed tube for oriented screws, and the screw and work positioning mechanisms and the work ejecting mechanism and their controls;

FIG. 3A is a view partly in side elevation and partly in vertical section of the hopper bowl shown in FIG. 1 in dotted lines and partly in each of FIGS. 3, 4 and 5, as the same appears mounted upon an electric vibrator mechanism by which the screws are caused to feed from the bowl hopper to the orienting rollers and which imparts certain motions to the screws on the rollers which appear to aid in the orienting operations;

FIG. 4 is a top plan view of the orienting roller mechanism and of a fragment of the hopper bowl from which the set screws are fed to the orienting rollers, the view position being indicated by the line 4—4 in FIG. 3;

FIG. 4A is a top plan view of the left hand end portion of the orienting rollers, with overlying parts omitted to show the preferred pulley grooving on those ends;

FIG. 5 is a view taken substantially along the section line 5—5 of FIG. 4 showing the manner in which the orienting rollers may be driven in unison at substantially the same speed in opposite directions so that a point on the surface of each will move upwardly on its approach toward a corresponding point on the roller;

FIG. 6 is a view in front elevation of a fragment of the front end of the machine taken substantially at the plane and looking in the direction indicated by the arrows 6—6 in FIG. 3;

FIG. 7 is a enlarged sectional view of the work item or article positioning means with a work article disposed thereon, the view being taken substantially along the section line 7—7 of FIG. 6;

FIGS. 8 and 9 illustrate the operation of the orienting rollers in the process of orienting a dog-point socket type set screw;

FIGS. 10 and 11 illustrate the operation of the orienting rollers in the process of orienting a special round nosed cone point slotted end set screw;

FIG. 12 illustrates a set screw having a flat point and a slotted opposite end, the screw being specially formed to enable such type of set screw to be oriented by the orienting rollers of the instant disclosure, this set screw being shown in its relation to the orienting rollers and just before turning under the influence of gravity to a position where its axis will be substantially at right angles to the axial position shown;

FIG. 13 is a sectional view of the rollers and screw shown in FIG. 12, taken substantially along the section line 13—13 of FIG. 12;

FIG. 14 is an enlarged detail view of the special flat end screw shown in FIGS. 12 and 13;

FIG. 15 is a top plan view of the screw receiving, transfer and positioning mechanism;

FIG. 16 is a view in front elevation of the mechanism shown in FIG. 15 with a work article in position for reception of a set screw and the screw driving or setting tool in position ready to drive a screw into the bore provided for its reception in the work article;

FIG. 17 is a view in section of an enlarged detail of screw receiving and positioning mechanism and of a portion of the screw ejector bar of the transfer mechanism associated therewith, the view being taken along the section line 17—17 of FIG. 16;

FIG. 18 is an exploded view, with parts in isometric projection, of the screw receiving, transfer and positioning mechanisms otherwise shown in FIGS. 15, 16 and 17; and FIGS. 19, 20, 21 and 22 are large scale more or less diagrammatic views illustrating the dimensional relationships between the orienting rollers and a flat point set screw of the type illustrated in FIGS. 12, 13 and 14, FIG. 20 being a section taken substantially along the section line 20—20 of FIG. 19.

THE MACHINE IN GENERAL

The special type of drill press shown in FIG. 1 has been chosen as more or less symbolic of one type of machine with which certain features of the invention may be combined and with which the combination of those features produces unique and valuable results. As stated in connection with the brief description of FIG. 1, above, this drill press, here employed in a rather symbolic manner, is a pneumatic-electric control type generally of the construction and operation disclosed in the Goldberg patents mentioned and is manufactured by Snow Mfg. Co., Bellwood, Illinois. It is to be understood, of course, that this particular type of machine is not necessary to the invention since other types of machines, other than drill presses, may be successfully employed to effect that part of the invention which resides in a combination of features.

The illustrated drill press has a supporting base B from which a column C rises to support the power head and various control and associated mechanisms generally designated H. A work platen, support bed or table T is vertically adjustable along vertical guideways carried by the column C and supported as well as adjusted by a piston rod R carrying a piston working within an air cylinder A. Air is admitted to or released from the cylinder A to raise or lower the table T by a control valve V in an air line to a suitable supply of compressed air and to an exhaust as will be appreciated.

Housed within the power head is an electric motor and suitable transmission by which a drill spindle and chuck D may be rotated, the spindle and chuck being mounted for rotation within a non-rotating platen P reciprocatably carried in an air cylinder unit U for vertical movements toward and from the table T and work thereon either automatically or semi-automatically, at the will of the operator through a foot control lever F or by hand controls for additional details of which including the details of functioning the reader may refer to the aforesaid Goldberg patents or to literature on the machines presently marketed thereunder. A limit and other control switch unit L, shown in front elevation and on a larger scale in FIG. 2 than in FIG. 1, is employed to determine the length and limits of the vertical movements or stroke of the platen P and the drill spindle and check D and to effect certain other operations. The spindle to which the chuck is attached is rotatably mounted in thrust and radial bearings within the platen P and has splined connection with the power drive so that it may be rotated continuously while it and the platen P are moved vertically up and down by pneumatically operated pistons in the air cylinder unit U.

Platen P carries an arm 25 which is apertured for the passage therethrough of a stroke control rod 26 which operates electric switch mechanisms within the control unit L. A lost motion connection between the arm 25 and control rod 26 is affected by a stop collar 27 which normally is secured in relatively fixed position on the control rod 26, and an adjustable nut 28 which, by reason of its threaded engagement with rod 26, is infinitely adjustable between predetermined limits relative to collar 27. A lock nut 29 also threaded on rod 26 is used to secure the adjustable nut 28 in set position. By reason of this arrangement the extent or limit of downward movement of the chuck D and the tool, such as a screw driver S carried by it, may be controlled to a nicety. When the tool S reaches a predetermined lower limit of its vertical travel for which the adjusting nut 28 has been set, the arm 25 will engage the nut 28 thereby moving the control rod 26 which actuates a switch within the control unit L which, in turn, actuates a solenoid controlled valve in a pneumatic line to the air cylinder unit U to cause the chuck D and tool S to retract upward. The arrangement is such that when the operator actuates the control lever F a switch is closed to actuate a solenoid operated valve to start the chuck and tool S on their downward path.

Mounted upon the table T and secured thereto in fixed relationship to the chuck D is a fixture or jig generally designated J which serves as a support and positioning means for work items and as means of receiving and positioning screws with respect to the work into which they are to be driven. A bracket K also secured to the table T supports an air motor or hammer M which functions in coordinated relationship with mechanism carried by the fixture J and with the operations of the tool S for several purposes to be revealed. Screws oriented with respect to their lead and tool engaging ends are supplied to the setting or driving tool S through a delivery tube N which receives the screws from the orienting mechanism which, in turn, has received the screws from a bowl type hopper indicated (in dotted outline) at O in FIG. 1. The bowl O is supported upon a vibration generator generally designated Z suitably supported by or, preferably, adjacent to and structurally independent of the drill press itself.

THE HOPPER FEED MECHANISM

In considering the hopper feed mechanism reference should be had to FIGS. 3, 3A, 4 and 5, Figure 3A showing the hopper bowl O mounted on the vibration generator Z which in this instance is an electromagnetic motor. Both the bowl and vibration generator here illustrated are of the type, construction and functioning of the bowl and vibration generator fully shown and described in Spurlin Patent No. 2,696,292 dated December 7, 1954, but other types of hopper and vibratory mechanisms may be substituted.

The bowl O has a conical interior bottom surface 31 upon which the screws are received and which causes the screws to flow radially outward toward the bowl side wall 32. The side wall 32 is so formed as to provide a spiral conveyor track 33 which increases in diameter from the bottom surface 31 upward to a place adjacent to the bowl top rim 34 where an integral part 34' of the rim projects more or less tangentially of the bowl and provides a tangentially extending terminal track portion 33'. The side wall 32 of the bowl may be recessed as shown in FIGS. 3, 3A and 4 so that the terminal portion 33' of the track juts out or overhangs the orienting mechanism to be described hereinafter. The radial width of the track is made only slightly greater than the diameter of the screws or other items which are to travel upwardly therealong so that the screws will be forced into single file with their axes aligned in the direction of travel, the contour of the track groove aiding in this functioning.

The hopper bowl is mounted upon a frame 36 supported upon the upper ends of springs 37 which at their lower ends are secured to a massive base member 38 within a housing 39. An electromagnetic motor comprising field coils is carried by base member 38 and an armature is carried by the frame 36. The motor produces vibratory impulses which so react upon the hopper bowl as to cause screws or other items within the bowl to move radially outward from the center of the bowl bottom toward the side wall and to travel in a circular or spiral path onto and thence up the spiral track 33 onto and outward to the end of tangential portion 33' from which they drop in succession onto the orienting rollers next to be described.

THE ORIENTING ROLLER MECHANISM

As above stated, the tangential bowl track portion 33' extends outwardly from the bowl side and overhangs a pair of similar, conically tapering orienting rollers 41 and 41' with the center of the track directly above and intermediate between the adjacent large end portions of the rollers. Each of the rollers 41 and 41', in this embodiment, is conically tapered to the same degree which, in the present example is 1°45', and over the same length as the other and is the correspondingly truncated portion of a right circular cone having a predetermined apex angle of 3°30'. Each roller is mounted for rotation about its axis between a pair of adjustable screw trunnions 42 and 43 which are carried in alignment with one another by the arms 44 and 44' of a yoke 45. That end of each roller which is adjacent to the terminal end portion of the hopper bowl track is reduced in diameter and provided with a circumferentially extending groove 46 which is to serve as a pulley or sheave for the reception of a belt 47 which transmits power to rotate the rollers as will more certainly appear hereinafter. It will be noted from FIGS. 4 and 4A that the pulley groove 46 in the outboard roller 41' is offset with respect to the pulley groove in the inboard roller 41 so that the drive belt 47 may be twisted to cross itself without self interference. Intermediate of its ends but substantially closer to its small end than to its large end, each roller is circumferentially grooved, as indicated at 48, in a manner, to an extent and for a purpose to follow.

Each of the yokes 45 is mounted, for lateral and longitudinal adjustment, upon a base plate 49 by means of a pair of cap screws 51 the shank of each of which passes through a bore 52 in the yokes into the base plate 49, the bores 52 being of a substantially greater diameter than the shanks of the cap screws 51 so that upon loosening the cap screws, the yokes (and rollers) may be shifted relative to one another in substantially every direction in a plane parallel to the base plate 49. The base plate 49 is rigidly secured and supported by a standard 53 in turn secured to and carried by the hopper bowl, a cap screw 54 passing through a vertically elongated slot 55 in the standard 53 as illustrated in FIG. 5. Secured to and extending outward and downward from the outermost of the yokes 45 is a motor mounting bracket 56 which, in this example, supports a small synchronous electric motor 57 preferably having a speed of 60 r.p.m. and on the shaft of which a pulley or sheave 58 is secured for driving the rollers 41, 41' through the belt 47. As indicated by the arrows in FIG. 5 the belt drive is arranged to rotate both rollers and each in such direction that a point on the surface of each will move in an upward direction as it approaches a corresponding point on the surface of the other.

The standard 53 is adjustable vertically and about the axis of cap screw 54, with respect to the hopper bowl so that the base plate together with the yokes 45 and the rollers 41, 41', as a unit, may be moved vertically toward and from the tangential portion 33' of the hopper bowl feed track 33 and also swung about a horizontal axis normal to a vertical plane parallel to the tangential track portion, the latter adjustment being for the purpose of permiting the roller axes to be tilted up or down about said horizontal axis. The roller axes are illustrated as lying in the same plane which, in this instance, is horizontal as shown in FIGS. 3 and 5, but by means of the adjustment last described this plane may be tilted about the above defined horizontal axis transverse to the roller axes to incline the roller axes in a downward direction away from the hopper thereby to increase the slope down which the screws or other articles from the hopper may flow, beyond that provided by the angle of roller taper or, the tilting may incline the roller axes upward and outward from the hopper thereby to reduce the angle of slope provided by the taper of the rollers either to some lesser degree than that shown or to zero or, the tilting may be effective to shift the roller axes to such an extent that the path of flow of screws along between the rollers is uphill along the rollers in their movements away from the hopper track.

As will be observable from the views of FIGS 3, 4 and 20, while the tapered rollers 41, 41' are so disposed in the instant embodiment that their axes lie in a horizontal plane, those axes converge toward one another from the large diameter ends of the rollers to their opposite or small diameter ends to include an angle 3°30' equal to the sum of the taper angles of the rollers, that is, to include an angle equal to the apex angle of the right circular cone of which each roller is a truncated part. Thus the lines of intersection of adjacent surfaces of the pair of rollers with the horizontal plane which contains the roller axes will be parallel to one another and, since the rollers normally will be spaced apart throughout their length this spacing will provide a slot of uniform width throughout the coextensive length of the rollers except for the grooves 48. The groove 48 of each roller is located closer to the outermost or small end of the roller than it is to the opposite end and at the same distance from the small end in each roller. Also the roller grooves 48 have the same contour length as measured along the tapered surface of the roller and the same depth as measured normal to the roller axis, so that the grooves may be characterized as complementary and mating with one another.

Normally the rollers will be so spaced that the minimum width of the slot between them as defined by the lines of intersection of a horizontal plane containing the roller axes, with the adjacent side wall surfaces of the rollers, will be several thousandths of an inch less than the minimum allowable crest diameter of the standard threat of the standard headless screw of a given size and fit class to be received upon the rollers for orientation purposes. In practice it has been found that a spacing of between 0.002" and 0.005" less than the minimum allowable major or crest diameter of a standard thread of a particular fit class and size of screw to be oriented or, in certain types of lock threaded screw such as those described and claimed in the copending application of Brown et al. Serial No. 485,630 filed February 2, 1955, and now abandoned, less than the minimum crest or major diameter of an oversize thread portion, is entirely satisfactory, or, less than the minimum allowable major or crest diameter of the standard portion of the thread of a definite size and fit class of screw to be oriented but of the type or character disclosed and claimed in Brown application Serial No. 514,298 filed June 9, 1955, now Patent No. 2,877,680. Ordinarily in spacing the orienting rollers, a decrease below the minimum allowable crest diameter of the screws to be oriented of from 0.002" to 0.003" will be found to be sufficient and desirable since the less the difference between the slot width and the allowable minimum major or crest diameter of the screws being oriented, the more closely will tolerances be held in the final oriented product since any undesirably undersize screws will drop through the slot and be rejected before reaching the grooves. The length of the grooves 48 is such as to be greater than the distance of the center of gravity of the screw from the closer end of the screw or thread and less than the distance from the center of gravity to the farther end of the screw or thread.

While FIGS. 8 to 13 inclusive represent headless set screws having several different styles of lead or entering end and two styles of driving end, either slotted or hexagonal socket, for engagement by an appropriate tool, the screws chosen for illustration in these figures are all of the same size namely, ¼—20 NC, ⅝" long, but are shown on a scale of twice actual size. The rollers for orienting such screws also are shown in FIGS. 8 to 13, inclusive, each being on a scale of twice actual size, actual size dimensions for this example being: diameter, large end, ⅜"; diameter, small end, ¼"; length from end of large diameter to end of small diameter, 1⅛"; diameter of each roller pulley is 1¹⁄₃₂" with a 60° V groove ¹⁄₃₂" deep. The motor pulley 58 is 1½" in diameter so with a motor speed of 60 r.p.m. each roller will rotate at about 260 r.p.m. The width of the slot between the rollers for the size of screw here mentioned preferably will be 0.248".

Each of the roller grooves 48, as in the illustrated embodiments, has an arcuate bottom preferably cut on a radius of from 0.003" to 0.004" greater than the radius of the maximum allowable major or crest diameter of screws of the size and fit class to be oriented when the rollers are spaced at from 0.002" to 0.003" less than the minimum allowable major or crest diameter of such screws. Thus the arcuate bottoms of the grooves will be concentric with the screws which pass between the rollers through the grooves with an average radial clearance of from 0.003" to 0.004" along the arcuate length of each of the opposed grooves. However, some screws have characteristics such as length and location of center of gravity which call for a construction wherein the groove is elongated although made no deeper than will give from 0.003" to 0.004" clearance from the maximum thread diameter screw passing through the same. Preferably also, clearances between the arms and sides of the yokes 45 and the ends and outer sides of the orienting rollers is such that no screw of a given size being oriented will pass therebetween to jam the apparatus.

Any screw of oversize, either of diameter or of length, such as will prevent the screw from passing through the grooves, will pass over and off of the smaller end portions of the rollers onto an inclined trough 59 which leads the screws to any suitable place of disposal. Likewise, should the screws fail for any other reason to feed downward through the opening provided by the grooves 48 as when feeding faster than disposal can be made of them, they may overflow the roller ends into the trough 59 and thence be fed back to the hopper bowl for recycling. Screws passing downward through the groove 48 may be received into the tube N which at this end has a flared mouth 61 which is positioned immediately below and in axial alignment, vertically, with the opening provided by the grooves 48 so that screws passing through the grooves will drop by gravity into the tube N for delivery to the positioning and inserting mechanisms to be described or to such other places as may be chosen. The diameter of a tube N will be such as will permit the screws to slide or fall freely therein but without canting or turning end for end.

Tapered rollers are preferred in most instances to straight or cylindrical rollers although the latter operate very satisfactorily even when their axes are horizontal instead of being inclined downhill away from the bowl hopper. Vibration and other forces operating upon the bowl to move the screws along the tangential and other portions of the track are simultaneously effective to move the screws along the rollers with or without forced or positive rotation of the rollers and without downward inclination of the path of flow of screws along the rollers.

Screws of "square" form, that is, screws having diameters equal or substantially equal to or even greater than their lengths, such as are disclosed in said application Serial No. 514,298, have been oriented very successfully by employing with the hopper feed described a pair of parallel spaced cylindrical rollers without any orienting grooves such as those described above. In such constructional arrangement the screws become oriented as fast as their reduced thread crest end portions (similar to the reduced crests of the lead end turns of the screw of FIG. 14) fall between the rollers. At this time the screws assume positions in which their axes will be vertical to the horizontal or substantially vertical to the plane containing the roller axes and each rides along the rollers supported by the untruncated crest of the thread turn immediately above the truncated crests. When such screws reach the ends of the rollers they may move off into a tube of square cross-section or other receiver adapted to the screws in their oriented state. However, screws of the type here mentioned will ride the tapered and grooved rollers with their axes vertical instead of horizontal, becoming oriented upon the rollers before reaching the grooves and dropping through the grooves into a tube or other receiver in which their oriented state will be maintained.

THE SCREW RECEIVING, EJECTING AND POSITIONING MECHANISMS AND THE WORK POSITIONING AND EJECTING MECHANISMS

Screws feed down tube N from the orienting rollers in succession, one upon another but in the same or oriented order, in this case with the lead ends down and their slotted or driving ends up. The bottom end of tube N is removably fitted within a vertical bore 62 in a relatively fixed tube end ferrule member 63 secured to a feed base or platform 64, carried by and firmly secured to the upright standard or support J the bottom end of which is removably secured to the vertically adjustable work bed or table of the drill press as above described. The forward side of the feed tube at 65 and correspondingly, the ferrule member at 66, is cut away to intercept their bores as best shown in FIG. 18. At their rearward sides both the tube and the ferrule member are also cut away as indicated at 67 and 68, respectively, to permit the entry and passage of a screw ejector and positioning bar 69 which is mounted for reciprocatory sliding movements in a channel 71 extending from front to rear in the feed base or platform 64.

The bottom-most screw dropping down the tube N comes to rest upon the upper surface of the base 64 within the channel 71 along which the ejector and positioning bar 69 will push it forward, as may be observed in FIG. 3, into a recess between a pair of jaws 72, one right hand and one left hand, which then releasably but firmly position and hold the screw and support it upon underlying lips 73 of the jaws until the jaws are spread as the screw is positively urged from between the jaws into the work by downward movement of the rotating screw driver tool S. The tool S is guided in part in its vertical path of movement by a guide plate 74 mounted upon and secured to the top of ferrule member 63, the guide plate having a notch 75 and an opening 76 for the tube N and the tool S, respectively. The jaws are formed on the ends of slide bars 77 which are of rectangular section and mounted for horizontal sliding movements toward and from one another within guide ways or slots 78 of conforming section formed across the forward upper face of the platform 64. Each jaw carrying slide bar 77 is connected to a knurled finger grip knob 79 by a rod 81 about which is a compression spring 82 one end of which abuts the adjacent end of the slide bar and the other end of which abuts against a downwardly directed flange 83 of a slide bar retainer 84 which is secured over each guideway or slot 78. The compression of the springs 82 between the slide bars 77 and the flanges 83 should be such as to maintain the jaws resiliently pressed together under a light pressure thereby firmly to secure a screw in position but a pressure insufficient to prevent or interfere with the downward movement of the driving tool in driving the screw and the resulting action of the screw in pushing or camming the jaws apart. Either jaw or both jaws may be retracted by manually pulling upon one or both of the finger grip knobs 79, as will be understood.

The screw ejector and positioning bar 69 at its rear end is retained in the guide slot 71 by a U-shaped bridge or saddle 85 which straddles the bar 69 and at its ends is secured to the feed base or platform 64. An anchor post 86 secures one end of a tension spring 87 the other end of which may be adjustably secured to a post 88 secured to the housing or cylinder of the air hammer M. The spring 87 normally tends to hold the ejector or positioning bar 69 in its retracted position, as shown in FIG. 3, with the anchor pin 86 abutting the forward face of the bridge or saddle 85 thereby limiting the rearward movement of the bar 69. The forward or screw engaging end face of the bar 69 is arcuately recessed as indicated at 70 in FIGS. 17 and 18, to receive and center the screw with which it is to engage to move the screw from the feed tube discharge into the jaws 72.

A shelf bracket 89 supports a block 91 having a horizontal bore 92 in which a plunger 93 is retained for forward horizontal sliding movement under the impact of the stem 94 of an air driven piston within the cylinder of the air hammer M. The block 91 has a longitudinally extending slot in its upper side in communication with the bore 92 so that a pusher foot 95, carried by the plunger 93 and adjustable longitudinally thereof, may be guided as the plunger is moved longitudinally of the bore. Pusher foot 95 has a striking face 96 which, when the plunger is hit or urged forward by the stem 94 of the air hammer, engages the rear end of the screw ejector and positioning bar 69 and urges it forward to bring its arcuate face 70 against the lowermost screw to move it from its position of rest upon the feed channel 71, within the bottom end of tube N, forward into the space between jaws 72 where it is held and finds bottom support upon the lips 73.

Secured to the front face of the standard J over a central upper portion thereof is a work base plate 97 which has a horizontal bore 98 therethrough for reception of the shank 99 of a work positioning and supporting stud the head of which is designated 101 in FIG. 7. A set screw 102 secured in a threaded transverse bore in plate 97 engages a flat 103 cut on the shank 99 to retain the stud in longitudinally (axial) adjusted position and prevents the stud from rotational displacement from a predetermined rotational position. The head 101 is bored transversely as indicated at 104 for the reception of a work positioning detent 105 which has a recess 106 in its inner or bottom end. Within recess 106 is one end of a compression spring 107 the other end of which abuts against the bottom of the transverse bore 104 continuously urging the detent 105 outward. In order to retain the detent 105 within the head 101 of the work positioning and supporting stud, the head is bored and threaded axially for reception of a full or half dog point set screw 108 the point of which rides in a vertical slot 109 in the detent 105 to prevent the detent from changing its rotational position within and from accidental release from the bore 104. An air vent passage 111 prevents air from compressing in the bore 104 when the detent is depressed and permits air to flow into the bore when the detent rises after being depressed.

The axis of the detent 105 and its bore 104 is in exact alignment with the axis of rotation and path of vertical movement of the tool S, and the axis of each screw 112 when received in the jaws 72 has its axis in alignment with the axes of tool S and detent 105. The work item in this case is a plastic knob 113 for a radio, television or other control shaft for which reason it has a shaft receiving bore 114 within which the head 101 of the work positioning stud is made to have a snug but sliding fit and also has a radial bore 115 the axis of which is normal to the axis of bore 114 and may be pretapped for reception of a set screw 112 the thread of which will mate with the thread in bore 115.

The detent 105 has a diameter approaching the diameter of the bore 115 so that when the knob 113 is placed on the stud head 101 the detent will make a reasonably snug fit within the bore 115 thereby to center and align the bore with the screw to be driven therein. In order to permit a knob 113 to be placed over the detent with ease the forward upper portion is bevelled and rounded as indicated at 116, and for removal purposes the rear upper portion likewise is rounded off, but not to the same extent as the forward portion since the removal of the knob is effected automatically by power means. This power means includes a pair of work ejection pusher pins 117 which are carried by a cross-head 118 secured to the plunger 93, the pins being guided in aligned bores extending through the standard J and the work base plate 97. When the plunger 93 is pushed forward by the piston stem 94 of the air hammer, the pusher pins push the work item, knob 113, forward causing the detent 105 to be depressed and to release the knob which then may be placed in a receptacle for disposal as desired. In some cases, depending upon the length of stroke of the tool S and the length of the screws 112, the screw may be inserted in the bore 115 to such depth as to depress the detent 105 so that the pusher pins may remove the knob from the work positioning stud with the application of very little force. The placement of a work item, i.e. another knob 113, upon the work positioning stud 101 pushes the pusher pins 117 back to the position shown in FIG. 3.

The air hammer motor M is arranged to be operated in timed relation to the operations of the tool S and to that end the admission of air to and the exhaust of air from the cylinder of the air hammer motor M through pressure line 119 is controlled by a two-way valve mechanism 121 which, in turn, is actuated by a solenoid 122 energized and deenergized by closing and opening a switch 123. The switch 123, symbolically illustrated in FIG. 3, is represented in FIG. 2 by an arm 124 which is actuated by a trigger member 125 on and adjustable along a push rod 126 which is carried by an extension of the arm 25 which, as will be recalled, moves with the chuck D and the tool S carried thereby.

When an operator wishes to insert a screw 112 within a bore 115 in a knob 113, the knob will be pushed onto the head 101 of the work positioning stud in such manner that the detent 105 is sprung into the bore 115 whereupon the switch controlling the downward movement of the chuck D and tool S is closed by operation of the foot lever F (or other switch actuating means), it being assumed that the main switch controlling the motor drive for the chuck and tool previously has been closed so that the tool S is rotating. As the rotating tool S descends its blade engages the slot in the screw 112 between the jaws 72 and forces the then rotating screw downward causing the jaws to spread to permit passage of the screw which engages the thread in the bore 115 of the knob 113 and is driven into the bore to a depth determined by the preset position of the adjustable limit nut 28.

Upon engagement of the nut 28 by the arm 25 the switch control rod is moved slightly downward such movement operating switch mechanisms of the limit switch control L to reverse the downward motion of tool S and to return it to its upper position at which it may remain until the operator again actuates the control lever F. During the downward movement of the chuck D carrying tool S, the switch 123 remains open and the cylinder of the air motor M is open to exhaust, the trigger 125 merely riding past the switch arm 124 which may be depressed against a spring action (not shown) to permit this to occur. However, during the upward or return stroke or movement of the tool S and as soon as it has risen sufficiently to clear the path of the next screw 112 to be moved from the base of tube N into the jaws 72, the trigger 125 will engage arm 124 to close the switch 123 thereby to energize the solenoid 122 to open the line 119 to a source of compressed air. Upon admission of air to the motor M the piston stem will be caused to strike the end of plunger 93 which will then, first, eject the work item (knob 113) and, second, operate the screw ejector and positioning bar 69 to move the next screw from the tube end along the channel 71 into position between jaws 72.

THE ORIENTING OPERATIONS

The vibrator mechanism causes the screws to flow out of a mass of screws dumped into the hopper bowl in hap-hazard array, the screws climbing the helical ramp or track up the bowl wall in a more or less continuous or steady stream with their axes as nearly aligned as the curved track will permit. The screws travel up the track in single file by reason of the narrow width and conformation of the track but in disordered or hit-or-miss array insofar as their lead and tool engaging (slotted or other) ends are concerned, some screws traveling with lead ends first and some with their tool engaging ends first.

While the rollers 41 may have their axes in the same horizontal plane, their taper provides a slight downhill path from their large diameter ends adjacent to the end of track 33' so that with the rollers rotating the screws falling onto them from the hopper will be moved steadily along between them toward the orienting grooves 48. Since the rollers are supported upon the hopper bowl which is being vibrated in such manner that the screws feed steadily along the ramp or track 33 including the tangential portion 33', and since the rollers, in effect, constitute a continuation of that track, the vibratory feed action augments the action of gravity in moving the screws along their roller carried path.

Certain types of set screw and the like having the standard or usual specifications of form or type and dimensions may readily be oriented by the mechanism described but other types are not susceptible of orientation or certainty of orientation except when constructed or modified as, for instance, described and claimed in said copending application Serial No. 514,298. FIGS. 8 to 11, inclusive, on a scale of twice actual size, illustrate the manner in which the orientation of the screws is effected while FIGS. 12 and 13, also on a scale of twice actual size, illustrate a specially constructed screw which would not be susceptible of orientation by the mechanism described but is readily oriented when so specially constructed as represented in the screw of FIG. 14 which is shown on a scale of four times actual size. The large scale views of FIGS. 19, 20, 21 and 22 the scale of each of which is twenty times actual size, diagrammatically reveal the orientation process and the relationships between any of the screws and the rollers in such process although the screw shown is that of FIG. 14. The several screws chosen for the showings in FIGS. 8 to 14, inclusive, and FIGS. 19 to 22, inclusive, are each ¼"—20 NC, ⅝" long, the screws of FIGS. 8 and 9 having hexagonal or fluted sockets in their tool engaging ends and requiring a conformably shaped tool end for driving while the screws shown in the other drawing figures have slots in their tool engaging ends for reception of a screw driver of blade form. All screws and their threads shown and described herein except as otherwise indicated as special in some certain respect are to be understood as conforming to "Screw Thread Standards for Federal Services, 1944" and "1950 Supplement," United States Department of Commerce, National Bureau of Standards, United States Government Printing Office, Washington, D.C.

Partly by reason of the removal of metal in forming the socket 213 in screw 212 and partly by the projection of the dog or half dog point 214 beyond the threaded length of the screw, the center of gravity is located at a point along the screw axis more than halfway of the threaded length from the socket or tool engaging end toward the lead or "point" end. The screw rides along the rollers with the crests of its thread turns in contact with the roller surfaces well down in the slot between the rollers since the narrowest part of the slot is only a few thousandths of an inch less than the minimum allowable crest diameter for a screw of the particular size and fit class to be oriented but the diameter of the dog point is less than the minimum slot width.

Therefore, if the screw approaches the orienting grooves with the dog point first and if the distance from the lead end of the thread to the center of gravity is not greater than the maximum allowable major or crest diameter of such screw, the groove length and the distance from the bottom of one roller groove to the bottom of the other being determined as stated, i.e., by cutting the grooves on a radius of from 0.003" to 0.004" radius greater than the maximum allowable major or crest diameter of the screw thread, then, when the screw reaches the place where the center of gravity overhangs the grooves, that is, is ahead of points of contact (tangency) between thread crest turns and the opposed roller surfaces at the adjacent brinks or edges of the grooves 48, the screw will swing or tilt about such points as fulcrum points and drop, with its axis vertical, into the tube N. If, on the other hand, the screw proceeds with its lighter or tool engaging end first, the rearward location of the center of gravity will keep the screw axis in its substantially horizontal position while the tool engaging end spans and crosses the grooves as illustrated in FIG. 9. As soon as the lead end of the screw thread clears the brinks of the grooves at the uphill side of the grooves, the screw will swing or tilt into a position with its axis vertical and then drop into the tube N.

The bullet nosed set screws 312 shown in FIGS. 10 and 11 operate in a manner similar to screws 212 but screws of the type of that designated 412 in FIGS. 12, 13, 14, 19, 20, 21 and 22, before being modified as shown in those figures do not orient or orient in a very unsatisfactory manner where they orient at all perhaps because the center of gravity is too close to the longitudinal center or to the center of the threaded length so that there can be no effective unbalancing (overbalancing) at the edges of the roller grooves. It has been discovered, however, that if the crest or major diameter is reduced for one, two, three or more turns of the thread at the lead end depending upon the screw length and the amount of material that may have been removed in forming the slot or socket at the tool engaging end, so that the center of gravity in effect is shifted toward the lead end to lie between the center of that portion of the threaded length which remains unreduced and the lead end of the screw, the screw will feed onto and along the rollers and be oriented after the satisfactory manner of screws 212 and 312.

The screw designated 412, which is a standard ¼—20 NC, ⅝" long in actual size, has had the thread crest or major diameter of turns 413 reduced by several thousandths of an inch below the minimum allowable major or crest diameter of the remaining standard or normal turns designated 414. Preferably this diameter reduction will be in the range of from 0.006" to 0.012", both limits inclusive. With its lead end turns thus reduced in their major diameter, the center of gravity of the screw, although actually displaced slightly away from the lead end toward the opposite or tool engaging end, in effect, will be brought substantially closer to the point or lead end of the unreduced crest portion of the thread than to the opposite end of such unreduced crest portion.

Illustrated in FIGS. 19 to 22, inclusive, are the relationships of dimensions of the screw 412 having truncated thread turn crests at the lead end, with respect to the rollers 41, 41' shown enlarged to the scale of the screw enlargement. In FIGS. 19, 21 and 22 certain points on the screw axis have been indicated as CL or center of screw length, FP or fulcrum point, the approximate point along the screw length where tilting or swinging takes place and CG or center of gravity. The center of gravity normally may be expected to lie in advance of or toward the lead end from the center of length of a screw of this type by reason of removal of metal to form the slot for tool engagement and the displacement of the center of gravity in the opposite direction or toward the tool engaging end by reduction of the crests of a few turns of the thread will be negligible. But the crest reduction changes the center of gravity with respect to the center of the axial length of the normal or untruncated crest portion of the thread.

If, now, the reduced crest diameter of the several thread turns is less than the width of the slot between the rollers 41, 41' and the orienting grooves are given the proper clearance over the maximum allowable major diameter of the normal or standard thread turns of the screw, the screw will orient after the manner of other screws above described. It will not matter which end of the screw precedes the other in movement along the track to the orienting rollers. The slot between the rollers may be so set as to permit undesirable undersizes of screws to fall through through for suitable disposal before they reach the orienting grooves and screws of oversize in length as well as oversize in diameter will continue off of the roller ends for rejection. When a delivery tube N loads up to its capacity all excess screws may flow off of the ends of the rollers as above described.

FIG. 20 somewhat diagrammatically illustrates the axial relationships of the rollers and the relationships between diameters of the tapered rollers at their large ends and at the grooves as well as the attitude and diameter (slotted end) of a screw between the rollers, the view being taken from section line 20—20 of FIG. 19. The axial centers of the respective rollers 41 and 41' at their large ends are designated RA and R'A while their axial centers at the plane of section are designated RA' and R'A'. The positions of the upper or lead end and the lower or slotted end of the screw 412 between the rollers are indicated, respectively, by SA and SA'. The lines joining RA and SA, and RA' and SA' cut the circumferences of the roller and screw circles (in the diagram) to indicate the tangency aspect of the screw with the roller along the lines of contact between them.

Although the invention has been disclosed in its presently preferred embodiment, it will be appreciated by those skilled in the art that it is susceptible of other embodiments and of many variations without departing from its essence and the scope of the appended claims.

I claim:

1. A machine adapted for feeding and orienting similar headless screws each having a helical thread thereon and said screws being of correspondingly equal dimensions of length and diameter and each having its center of gravity located closer to one end of the thread than to the other comprising, a pair of tapered rollers mounted for rotation with their axes substantially horizontal and in a common plane, each of said rollers having a circumferentially extending groove intermediate of its ends, the groove of each roller being substantially the counterpart of the groove in the other roller and mating therewith, each roller over a length between said groove and each end being so disposed with respect to the other that the lines of intersection of said plane with the adjacent surfaces of the rollers over such lengths will be substantially parallel, the maximum distance between said rollers normal to said parallel lines being less than the crest diameter of the helical thread, the distance between the bottoms of the grooves measured in said plane and normal to said parallel lines being greater than the crest diameter of the helical thread, the length of each groove measured in said plane and parallel to said parallel lines being greater than the distance from the center of gravity of a screw to the closest end of the screw thread and less than the distance from the other end of the screw thread to such center of gravity, both of the last said distances being measured along the axis of the screw, means for rotating each of said rollers so that a point on its surface moves upward upon approach of such point toward the other roller, and means independent of the action of gravity for moving screws disposed between said rollers along said rollers to said grooves.

2. A machine adapted for feeding and orienting similar headless screws each having a helical thread thereon and said screws being of correspondingly equal dimensions of length and diameter and each having its center of gravity located closer to one end of the thread than to the other comprising, a pair of tapered rollers mounted for rotation with their axes substantially horizontal and in a common plane, the taper of the rollers being in the same order and to substantially the same degree, each of said rollers having a circumferentially extending groove intermediate of its ends, the groove of each roller being substantially the counterpart of the groove in the other roller and mating therewith, each roller over a length between said groove and each end being so disposed with respect to the other that the lines of intersection of said plane with the adjacent surfaces of the rollers over such lengths will be substantially parallel, the maximum distance between said rollers normal to said parallel lines being less than the crest diameter of the helical thread, the distance between the bottoms of the grooves measured in said plane and normal to said parallel lines being greater than the crest diameter of the helical thread, the length of each groove measured in said plane and parallel to said parallel lines being greater than the distance from the center of gravity of a screw to the closest end of the screw thread and less than the distance from the other end of the screw thread to such center of gravity, both of the last said distances being measured along the axis of the screw.

3. A machine adapted for feeding and orienting similar headless screws each having a helical thread thereon and said screws being of correspondingly equal dimensions of length and diameter and each having its center of gravity located closer to one end of the thread than to the other comprising, a pair of tapered rollers mounted for rotation with their axes substantially horizontal and in a common plane, each of said rollers having a circumferentially extending groove intermediate of its ends, the groove of each roller being substantially the counterpart of the groove in the other roller and mating therewith, each roller over a length between said groove and each end being so disposed with respect to the other that the lines of intersection of said plane with the adjacent surfaces of the rollers over such lengths will be substantially parallel, the maximum distance between said rollers normal to said parallel lines being less than the crest diameter of the said thread, the distance between the bottoms of the grooves measured in said plane and normal to said parallel lines being greater than the crest diameter of the said thread, the length of each groove measured in said plane and parallel to said parallel lines being greater than the distance from the center of gravity of a screw to the closest end of the screw thread and less than the distance from the other end of the screw thread to such center of gravity, both of the last said distances being measured along the axis of the screw.

4. An orienting feeder for set screws or like articles each having a main body portion of a maximum uniform width and having a center of gravity closer to one end of the main body portion than the other, comprising a vibratory elevator bowl having a spiral conveyor track for feeding articles from a mass in the bowl upward to a place adjacent to the bowl rim, and a pair of rollers carried by said bowl with one end of each roller disposed adjacent to the upper end of said conveyor track, said rollers being mounted for rotation about axes lying in substantially the same plane and extending in the same general direction away from the bowl rim, said rollers being spaced a substantially uniform distance from one another to provide therebetween a slot of substantially uniform width less than the width of the main body portion of the articles, each of said rollers having a circumferential groove spaced inward from an end of the roller, said grooves being complementary to one another to form an opening of a width greater than the width of the main body portion of the article and being of a length greater than the distance of the center of gravity from the closest end of the main body portion of the article and less than the distance from the center of gravity to the farther end of the main body portion of the article.

5. In a device for orienting similar elongated articles having a main body portion of uniform width and each of which is gravitationally asymmetric with respect to the opposite ends of said main body portion, a pair of tapered rollers mounted with their axes converging in substantially a horizontal plane, said rollers being spaced from one another a uniform distance to provide therebetween a slot of substantially uniform width less than the width of the main body portion of the articles, means for counter-rotating each of said rollers in directions such that points on their surface move upward upon approaching the slot, means for feeding the articles onto said rollers at the end of the pair where the axes are spaced the greatest distance, each of said rollers having an intermediate circumferential groove, said grooves being complementary to one another and of a depth such that the combined depths of the grooves plus the width of the slot is slightly greater than the width of the main body portion of the article, the length of each groove measured along the slot being less than the distance of the center of gravity of the article from the farther end of the main body portion of the article and greater than the distance from the center of gravity to the closer end of the main body portion of the article, and means for moving the articles fed onto said pair of rollers by said feeding means along and between the rollers toward said groove and the opposite ends of the rollers.

6. In a device as set forth in claim 5 wherein the means for moving the articles along and between the rollers includes means for vibrating the rollers endwise.

7. In a machine for orienting screws or the like each having a threaded main body portion of a maximum uniform width, the opposite ends of which are dissimilar and each having a center of gravity closer to one end of its threaded length than to the other end of its threaded length, means for delivering from a mass of such screws a succession of screws arranged in a single file row with the axes of successive screws in the row aligned, a pair of rollers mounted to receive said row of screws, said rollers being mounted in spaced relation to provide between them a slot of substantially uniform width less than the major diameter of the thread of the screw, each of said rollers having a circumferentially extending groove spaced from each of its ends, said grooves being complementary to one another, the combined depths of the grooves plus the width of the slot being slightly greater than the major diameter of the thread of the screw and the length of each groove measured along the slot being less than the distance of the center of gravity of the screw from the farther end of its threaded length and greater than the distance of its center of gravity to the closer end of its threaded length, and means for moving the screws in the direction of their axes onto and between the rollers from one end thereof toward said grooves and the opposite ends of said rollers, said means for moving the screws including means for applying a reciprocatory motion to said rollers in a direction generally parallel to their axes.

8. A machine adapted for feeding and orienting similar headless screws each having a main body portion of a maximum substantially uniform diameter and each having its center of gravity located closer to one end of the main body portion than to the other, comprising a pair of rollers mounted for rotation with their axes substantially in a common plane, each of said rollers having a circumferentially extending groove intermediate of its ends, the groove of each roller being substantially the counterpart of the groove in the other roller and mating therewith, each roller over a length between said groove and each end being so disposed with respect to the other that the lines of intersection of said plane with the adjacent surfaces of the rollers over such lengths will be substantially parallel, the maximum distance between said rollers normal to said parallel lines being less than the diameter of the main body portion, the distance between the bottoms of the grooves measured in said plane and normal to said parallel lines being greater than the diameter of the main body portion, the length of each groove measured in said plane and parallel to said parallel lines being greater than the distance from the center of gravity of a screw to the closest end of the main body portion of that screw and less than the distance from the other end of the main body portion to such center of gravity, both of the last said distances being measured along the axis of the screw, and means for moving the screws in the direction of their axes onto and between the rollers from one end thereof toward said grooves and the opposite ends of said rollers, said means for moving the screws including means for applying a reciprocatory motion to said rollers in a direction generally parallel to their axes.

References Cited in the file of this patent

UNITED STATES PATENTS

| 275,558 | Wills et al. | Apr. 10, 1883 |
| 1,086,210 | Paridon et al. | Feb. 3, 1914 |
| 1,339,904 | Monkhorst | May 11, 1920 |
| 1,463,338 | Schroeder | July 31, 1923 |
| 1,760,441 | Risser | May 27, 1930 |
| 2,549,322 | McKinsey | Apr. 17, 1951 |
| 2,615,184 | Williams | Oct. 28, 1952 |
| 2,615,556 | Hoopes et al. | Oct. 28, 1952 |
| 2,628,646 | Bailey et al. | Feb. 17, 1953 |
| 2,638,945 | Austin | May 19, 1953 |
| 2,663,334 | Linsman et al. | Dec. 22, 1953 |
| 2,681,668 | Lubbert | June 22, 1954 |
| 2,696,285 | Zenlea | Dec. 7, 1954 |
| 2,710,712 | Friedman | June 14, 1955 |
| 2,807,350 | Rayburn et al. | Sept. 24, 1957 |
| 2,825,489 | Batchelder | Mar. 4, 1958 |
| 2,858,930 | Aidlin | Nov. 4, 1958 |

FOREIGN PATENTS

| 722,016 | Great Britain | Jan. 19, 1955 |